(12) United States Patent
Prasad et al.

(10) Patent No.: US 12,206,845 B2
(45) Date of Patent: Jan. 21, 2025

(54) ENTROPY-BASED PRE-FILTERING USING NEURAL NETWORKS FOR STREAMING APPLICATIONS

(71) Applicant: NVIDIA Corporation, Santa Clara, CA (US)

(72) Inventors: Keshava Prasad, Karnataka (IN); Hassane Samir Azar, Los Altos, CA (US); Vinayak Pore, Maharashtra (IN)

(73) Assignee: NVIDIA Corporation

( * ) Notice: Subject to any disclaimer, the term of this patent is extended or adjusted under 35 U.S.C. 154(b) by 669 days.

(21) Appl. No.: 17/466,176

(22) Filed: Sep. 3, 2021

(65) Prior Publication Data
US 2023/0085156 A1   Mar. 16, 2023

(51) Int. Cl.
| | | |
|---|---|---|
| H04N 19/117 | (2014.01) | |
| H04N 19/164 | (2014.01) | |
| H04N 21/2662 | (2011.01) | |

(52) U.S. Cl.
CPC ......... *H04N 19/117* (2014.11); *H04N 19/164* (2014.11); *H04N 21/2662* (2013.01)

(58) Field of Classification Search
CPC .............. H04N 19/117; H04N 19/164; H04N 21/2662; H04N 19/172; H04N 19/85; G06N 3/048; G06N 3/0455; G06N 3/0464; G06N 3/088; A63F 13/358; A63F 13/52; A63F 13/67

See application file for complete search history.

(56) References Cited

U.S. PATENT DOCUMENTS

| | | | |
|---|---|---|---|
| 2015/0043808 A1 | 2/2015 | Takahashi et al. | |
| 2015/0181168 A1 | 6/2015 | Pahalawatta et al. | |
| 2020/0097754 A1* | 3/2020 | Tawari | G06V 10/82 |
| 2020/0184252 A1* | 6/2020 | Syeda-Mahmood | G06V 10/26 |
| 2022/0012859 A1* | 1/2022 | Zhao | G06T 3/60 |

FOREIGN PATENT DOCUMENTS

WO   2013006115 A2   1/2013

OTHER PUBLICATIONS

First Office Action from German Patent Application No. 10 2022 121 250.5, filed Aug. 23, 2022, mailed Feb. 17, 2023, 10 pgs.
Purohit, et al.; "Depth-Guided Dense Dynamic Filtering Network for Bokeh Effect Rendering", 2019 IEEE/CVF International Conference on Computer Vision Workshop (ICCVW), (2019) 10 pgs.

* cited by examiner

*Primary Examiner* — Pinalben Patel
(74) *Attorney, Agent, or Firm* — Taylor English Duma L.L.P.

(57) ABSTRACT

In various examples, a deep neural network (DNN) based pre-filter for content streaming applications is used to dynamically adapt scene entropy (e.g., complexity) in response to changing network or system conditions of an end-user device. For example, where network and/or system performance issues or degradation are identified, the DNN may be implemented as a frame pre-filter to reduce the complexity or entropy of the frame prior to streaming—thereby allowing the frame to be streamed at a reduced bit rate without requiring a change in resolution. The DNN-based pre-filter may be tuned to maintain image detail along object, boundary, and/or surface edges such that scene navigation—such as by a user participating in an instance of an application—may be easier and more natural to the user.

23 Claims, 12 Drawing Sheets

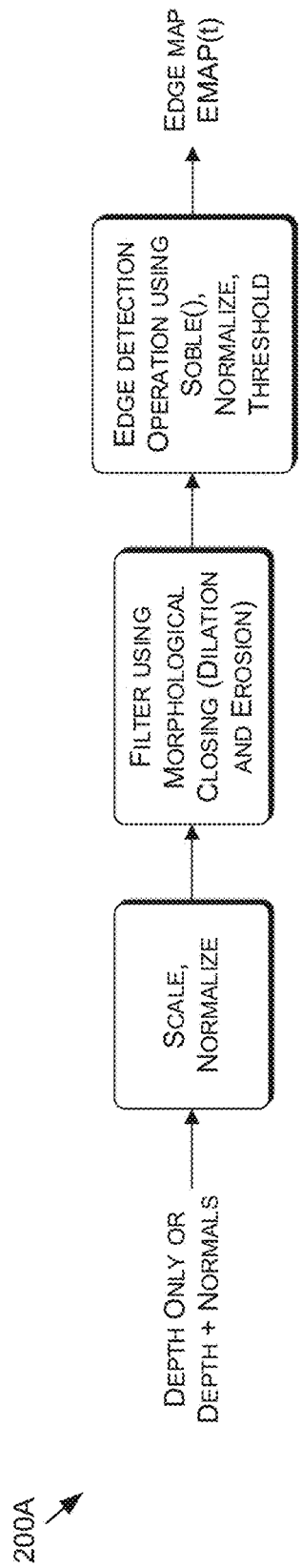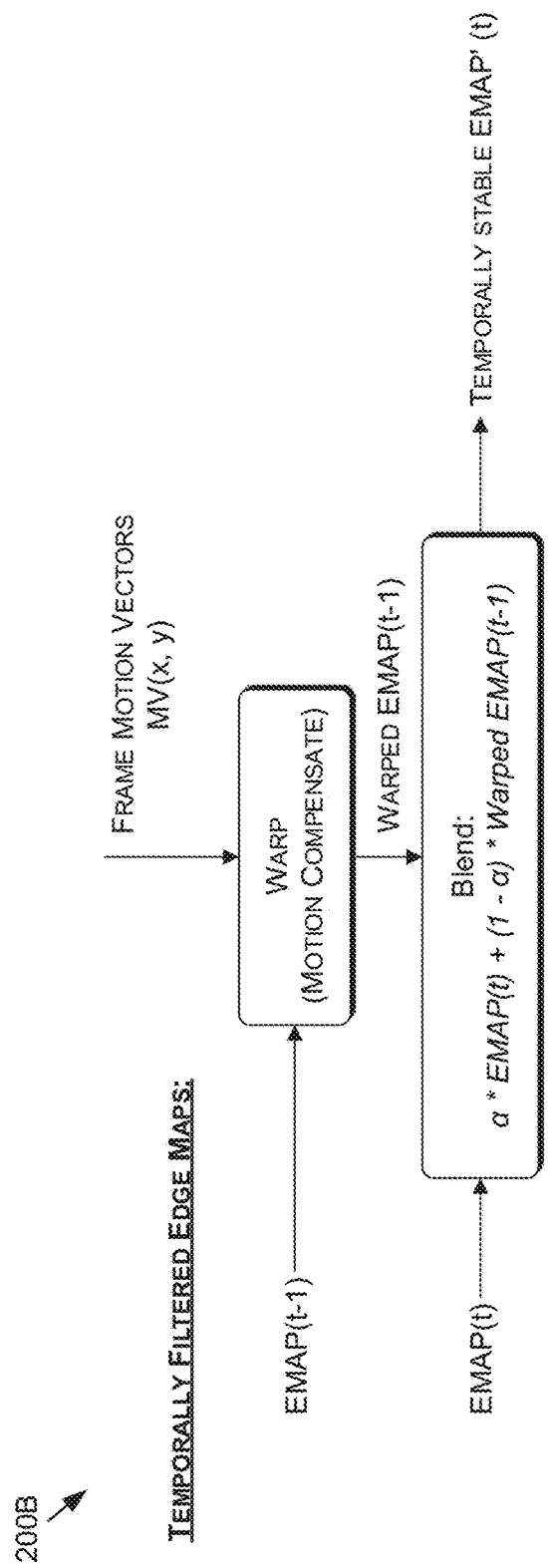
FIGURE 2A
FIGURE 2B

ENTROPY-BASED PRE-FILTERING USING NEURAL NETWORKS FOR STREAMING APPLICATIONS

BACKGROUND

Traditional video game streaming systems employ dynamic resolution changes (e.g., from 1080 p to 720 p, and so on) to address changing network conditions. For example, these systems may reduce frame resolution as network bandwidth drops, and may increase frame resolution as network bandwidth increases. To do so, these traditional systems may introduce intra-coded frames ("I-frames")—or other intra frame types—in the video stream to enable resolution transition. However, I-frames only undergo spatial compression and not temporal compression, and thus require a higher bit rate to transmit. As a result, since the dynamic resolution change may be triggered in response to already strained network conditions, these traditional systems may transmit high bit rate I-frames during a time when channel capacity is reduced. The end-user device, therefore, may receive incomplete I-frames (e.g., due to packet loss) and/or may receive complete or incomplete I-frames with higher latency. As such, the picture quality of the frames of the stream may be reduced, and the frames may be received with higher latency resulting in noticeable lag—thereby affecting the user experience, especially in high-performance applications such as cloud gaming, virtual reality, augmented reality, and/or mixed reality applications. For example, streams received from these traditional systems may display degraded video streams, in which image detail is reduced by packet loss without accounting for the preservation of important scene information. Further, these traditional systems may require re-initialization of the client decoder to support the new resolution, which consumes additional resources on the end-user side, while further contributing to the quality degradation of the displayed video—e.g., by the way of "hang", "stutters," hitches," or "jitter," where a video may be displayed at a reduced frame rate or with disrupted frame pacing.

SUMMARY

Embodiments of the present disclosure relate to a neural network-based pre-filter for content streaming applications. Systems and methods are disclosed that dynamically adapt scene entropy (e.g., complexity) in response to changing network or system conditions to manage streaming bit rates. For example, and in contrast to traditional systems, network and/or system conditions of an end-user device may be monitored to determine whether a frame entropy should be adapted to reduce a bit rate for streaming video. Where network and/or system conditions are optimal, no reduction may be necessary, and the full complexity (highest entropy) frame may be streamed to the end-user device. However, where network and/or system performance issues or degradation are identified, a deep neural network (DNN) may be implemented as a frame pre-filter to reduce the complexity or entropy of the frame prior to streaming—thereby allowing the frame to be streamed at a reduced bit rate without requiring a change in resolution. As a result, and because frame resolution changes are not required, inserting I-frames or other intra frame types into reduced-capacity network channels may not be necessary, thereby also avoiding decoder re-initialization of the end-user device. To account for loss of detail from the pre-filter, the DNN-based pre-filter may be tuned to maintain image detail along object, boundary, and/or surface edges (which may be visually/perceptually important to retain) such that scene navigation—such as by a user participating in an instance of an application—may be easier and more natural to the user.

In addition, in embodiments, different DNNs may be trained for different entropy values to accommodate different network and/or system conditions. For example, as network conditions improve, a DNN may be selected that pre-filters a frame less (e.g., resulting in a higher entropy pre-filtered frame) than when the network conditions are compromised. In this way, rather than adjusting frame resolutions—a drawback of conventional systems—the present system may adjust an amount of filtering using intelligently selected DNNs that adjust bit rates to meet current network and/or system conditions of an end-user device.

BRIEF DESCRIPTION OF THE DRAWINGS

The present systems and methods for neural network based pre-filter for content streaming applications are described in detail below with reference to the attached drawing figures, wherein:

FIG. 2A is a data flow diagram showing an example process for generating an edge map, in accordance with some embodiments of the present disclosure;

FIG. 2B is a data flow diagram showing an example process of temporally filtering edge maps, in accordance with some embodiments of the present disclosure;

DETAILED DESCRIPTION

Figure 1A:
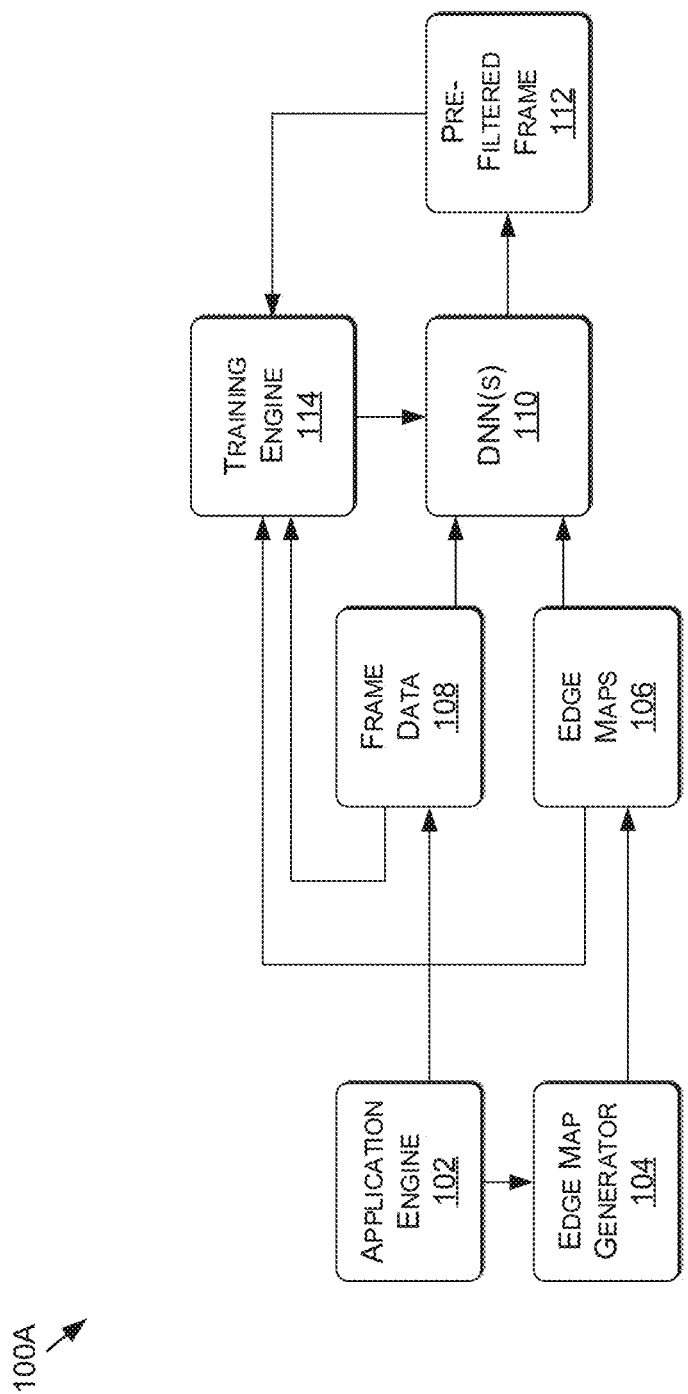
FIGS. 1A-1B are data flow diagrams showing example processes for training a deep neural network (DNN) to pre-filter a frame, in accordance with some embodiments of the present disclosure.

Systems and methods are disclosed related to a neural network based pre-filter for content streaming applications. For example, the systems and methods of the present disclosure may be implemented for any application where frame pre-filtering may be implemented to reduce a bit rate or complexity of a frame—such as in simulation applications, virtual reality (VR), augmented reality (AR), and/or mixed reality (MR) applications, content editing applications, social media applications, remote desktop applications, content streaming applications, game streaming applications, video conferencing applications, and/or the like. As such, the pre-filters described herein may be useful for adjusting frame entropy levels for images or video generated from any source and within any number of different application types.

The disclosed systems and methods may use at least one deep neural network (DNN) to pre-filter a frame (e.g., prior to compression and transmission to an end-user device). For example, depending on current system and/or network conditions of an end-user device, an entropy control parameter (e.g., $\lambda$) of filtering may be determined. In some embodiments, the entropy control parameter may be inversely proportional to the entropy level, complexity, or detail desired for a scene at a given time. As such, where system and/or network performance is low, a lower entropy level may be desired, and thus the entropy control parameter may be higher such that a DNN-based pre-filter is selected that filters—or blurs—a frame more drastically in an effort to reduce the bit rate of the stream. As such, in embodiments, any number of different DNNs may be trained as pre-filters corresponding to a respective entropy control parameters. Network and/or system conditions may be determined, compared to a lookup table or inserted into an algorithm, and an entropy control parameter may be computed. Once computed, the entropy control parameter may be used to select a corresponding DNN-based pre-filter, and the frame(s) may be filtered to generate pre-filtered frames. As network and/or system performance change during a stream, the DNN-based pre-filter may be changed to account for changing entropy control parameters. In some embodiments, in addition to or alternatively from having separate DNNs for different entropy control parameter values, a single DNN may be trained to execute different levels of filtering based on a currently determined entropy control parameter values. In such an embodiment, the value of the entropy control parameter may be provided to the DNN as a separate input, and this value may be used by the DNN to perform the associated level of filtering.

During training, the one or more DNNs may be trained through an unsupervised learning process involving one or more loss functions. For example, at each iteration, the DNN may receive as input a current frame and an edge map—such as a saliency map, a binary map or image, and/or the like—that is encoded with values that indicate locations of surface, object, and/or boundary edges depicted in a frame. To compute the edge map for each frame, in some examples, depth information and/or surface normal information may be used. For example, depth information and/or surface normal information may be maintained by a currently executing application, and this information may be used to generate edge maps or saliency maps. The depth information or representation and/or the surface normal information or representation may then be used to generate an edge map that is indicative of the edges depicted by the frame. For example, the depth representation and/or the normal representation may be scaled and/or normalized, filtered (e.g., using morphological closing, including dilation and erosion), and/or may undergo an edge detection operation (e.g., such as by using an edge detection algorithm, including a Sobel operator). The edge map that is generated may include a saliency map, a binary map or image, and/or another edge map representation. In such an example, edge pixels may be encoded with a first value (e.g., 1) and non-edge pixels may be encoded with a second value (e.g., 0) to indicate the location of edges in the frame. The edge map corresponding to the frame, and the frame, may be applied to the DNN as input.

The DNN may compute a filtered image as output, and the filtered image may be compared—in an unsupervised manner, in embodiments—to the frame and/or the edge map using one or more loss functions. For example, an edge loss function may be used to train the DNN-based pre-filter to maintain edge detail between frames of a scene and corresponding pre-filtered frames of the scene such that pixel values along and/or near identified edges in the frames are maintained—or closely maintained—such that navigation through the scene is more clear. In embodiments, the edge loss function may compare pixel values of the frame and the pre-filtered frame at pixel locations determined to correspond to edges from the edge map. That is, for a given pixel from the edge map indicated as corresponding to an edge, the pixel value at that location in the frame and the pixel value at that location from the pre-filtered frame may be compared in such a way that differences are penalized—e.g., the loss is higher where the pixel values differ more. As another example, an entropy loss function may be used that corresponds to reducing or meeting a frame entropy corresponding to a currently desired entropy control parameter value (e.g., higher value of an entropy control parameter, lower entropy of the pre-filtered frame, and vice versa). For example, the entropy loss function may measure pixel gradients within portions of the pre-filtered frame—except for portions corresponding to edges as identified using the edge maps—in order to reduce the gradient between neighboring pixels. In such an example, the higher the entropy control parameter value, the more a higher gradient is penalized using the entropy loss function. As such, where a high value for the entropy control parameter is used (e.g., indicative of lower frame entropy), the gradient between neighboring or surrounding pixels may be reduced such that differences in pixel values between neighboring or surrounding pixels are minimal. Similarly, for lower entropy control parameter values (e.g., indicative of higher frame entropy), the gradient between neighboring or surrounding pixels may be reduced less such that differences in pixels are allowed to be greater (but not as great as a full entropy frame). Where more than one loss function is used, the loss functions may be weighted during training. For example, the entropy control parameter value may be used to weight the loss functions such that for higher entropy control parameter values, consistency between pixel values of neighboring or surrounding pixels is more heavily enforced, and vice versa.

The DNNs used may include any DNN type—such as convolutional neural networks (CNNs)—and may include any architecture type—such as an autoencoder architecture. Once trained, the selected DNN-based pre-filter may be used to generate pre-filtered frames using an input frame and a corresponding edge map. The computed pre-filtered frame may then be encoded and compressed at a lower bit rate than the input frame—where less than full entropy is desired—and the encoded frame may be transmitted to an end-user device. As a result, the bit rate may be lowered for the stream, and latency may not be introduced as frame resolutions change—e.g., because the frame resolution remains consistent throughout, and only the level of detail within the frame is changed.

Figure 1B:
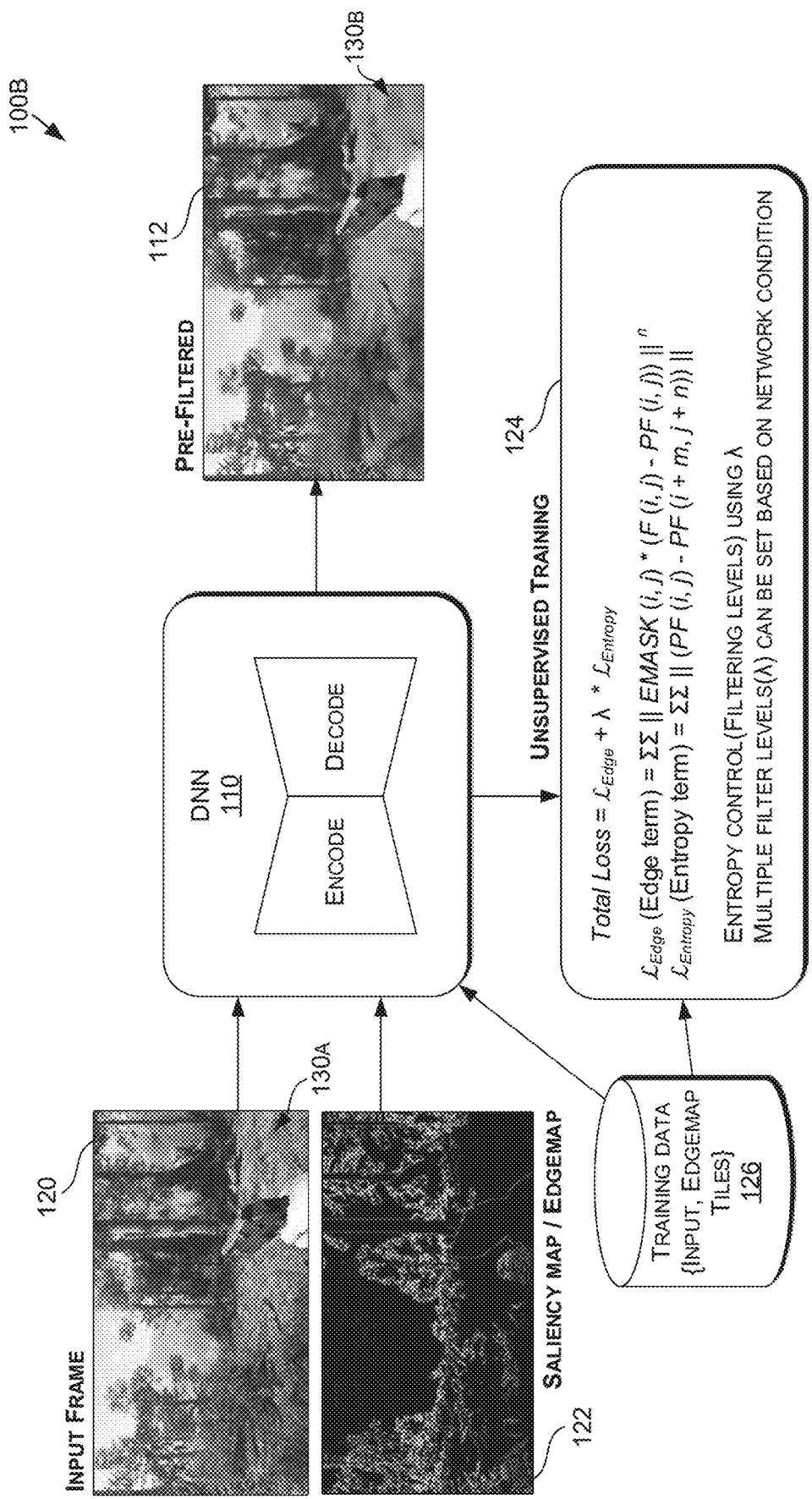

With reference to FIGS. 1A-1B, FIGS. 1A-1B are example data flow diagrams for processes 100A and 100B of frame pre-filtering, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. The processes 100A and 100B may be implemented using similar features, functionality, and/or components as example content streaming system 700 of FIG. 7, example computing device 800 of FIG. 8, and/or example data center 900 of FIG. 9.

The process 100A of FIG. 1A includes application engine 102, edge map generator 104, edge maps 106, frame data 108, DNN(s) 110, pre-filtered frame 112, and training engine 114. In some embodiments, the application engine 102 may be a streaming application that is configured to provide image frames, I-frames, code, files, and other data that are necessary to display application visualizations. By way of non-limiting example, the application engine 102 may execute simulation applications, virtual reality (VR), augmented reality (AR), and/or mixed reality (MR) applications, content editing applications, social media applications, remote desktop applications, content streaming applications, game streaming applications, video conferencing applications, and/or the like.

In operation, the process 100A may be implemented to train the DNN(s) 110 through an unsupervised learning process involving one or more loss functions. Initially, at each interval, the application engine 102 may provide a frame—such as input frame 120 of FIG. 1B, which may depict a frame of a video, a game, an application, etc.—to the edge map generator 104. The edge map generator 104 may use depth information and/or surface normal information of the frame to compute the edge maps 106. In some embodiments, such as when depth information and/or surface normal information are not available for an application, the edge map generator 104 may use the frame data 108 to generate the edge maps 106—e.g., using edge detection on the frame data 108. For example, sharp contrast between pixel values of neighboring pixels represented by the frame data may indicate an edge. The edge map 106 may include a saliency map, a binary map or image, a grayscale map or image, and/or another edge map representation. As shown in example edge map 122 of FIG. 1B, edge pixels (e.g., shown as white pixels) may be encoded with a first value (e.g., 1) and non-edge pixels (e.g., shown as black pixels) may be encoded with a second value (e.g., 0) to indicate the location of edges in the frame.

Depth information and/or surface normal information may be maintained by the application engine 102, and this information may be used to generate the edge map 106. Turning briefly to FIGS. 2C-2F, FIGS. 2C-2F illustrate a frame 220C/D/E/F of a scene, each depicting a different example visualization of frame information. In some embodiments, frame 220C may depict a full detail frame and may be processed by the edge map generator 104 to determine, extract, and/or identify depth information from the frame 220C to generate frame 220D. Frame 200D may depict depth information that may be encoded into the frame 220C by the application engine 102 and/or by another application or process. The depth information in frame 220D may then be used to generate edge map 220F. For example, the edge map generator 104 may use disparities (e.g., differences in depth values for neighboring pixels that exceed a threshold) in the depth information to identify edges of the frame 220C to generate the edge map 220F. In some embodiments, frame 220C may be processed by the edge map generator 104 to determine, extract, and/or identify surface normal information (e.g., lines, rays, and/or vectors that are perpendicular to a given surface) from the frame 220C to generate frame 220E, which may depict the surface normal information—e.g., the surface normal value at each pixel may be encoded to the pixel. The surface normal information may then be used to generate the edge map 220F. For example, because it may be assumed that an edge of an object may be formed by the intersection of two or more planar or semi-planar surfaces, the edge map generator 104 may utilize surface normal vector changes (e.g., an angle between neighboring vectors) that exceed a threshold to identify edges of the frame 220C to generate the edge map 220F.

In some embodiments, one or more of the frame 220D and the frame 220E—e.g., corresponding to a depth map and a surface normal map, respectively—may be used to generate the edge map of frame 220F. In other embodiments, the frame 220C—without first determining depth and/or surface normal information—may be used to generate the edge map of frame 220F. For example, changes in pixel values beyond a threshold amount may indicate edge locations, and this information may be used to determine the edges for the edge map. However, using the pixel values alone without the depth map and/or the surface normal map may lead to less accurate results than using the depth map and/or the surface normal map.

In further embodiments to generate an edge map, such as is shown in process 200 of FIG. 2A, the depth information and/or the normal information may be scaled and/or normalized, filtered (e.g., using morphological closing, including dilation and erosion), and/or may undergo an edge detection operation (e.g., such as by using an edge detection algorithm, including a Sobel operator). Additionally, or alternatively, a temporally filtered edge map may be generated based on process 200B of FIG. 2B. For example, in process 200B, frame motion vectors (e.g., corresponding to movement of a virtual camera within a virtual environment from time t−1 to time t) may be used to warp or compensate for motion and to generate a warped edge map at t−1. In such an example, the edge map corresponding to time t−1 may be converted to a coordinate system of time t, such that the warped edge map for time t−1 and the edge map for time t can be blended together. The warped edge map may then be blended with a current edge map to generate a temporally stable edge map, in embodiments, according to equation (1) below:

$$\alpha * \text{EMAP}(t) + (1-\alpha) * \text{Warped EMAP}(t-1) \tag{1}$$

where α is a weighting value (e.g. between 0.0 and 1.0, with 0.5 being used in non-limiting embodiments) that may be empirically determined to yield the most accurate temporally stable results.

Returning to FIG. 1A, in some embodiments, the edge map 106 corresponding to the frame provided by the application engine, and the frame data 108 of the frame provided by the application engine, may be applied to the DNN 110 as inputs. The DNN 110 may include any DNN type—such as a convolutional neural network (CNN)—and may include any architecture type—such as an autoencoder, encoder/decoder, and/or other architecture, in embodiments. Although described as a DNN 110, the DNN 110 may include, for example, and without limitation, any type of machine learning model, such as a machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, long/short term memory/LSTM, Hopfield, Boltzmann, deep belief, deconvolutional, generative adversarial, liquid state machine, etc.), computer vision algorithms, and/or other types of machine learning models. Once trained by the training engine 114, the DNN 110 may be used to generate the pre-filtered frame 112 using the frame data 108 and the edge maps 106.

Figure 1C:
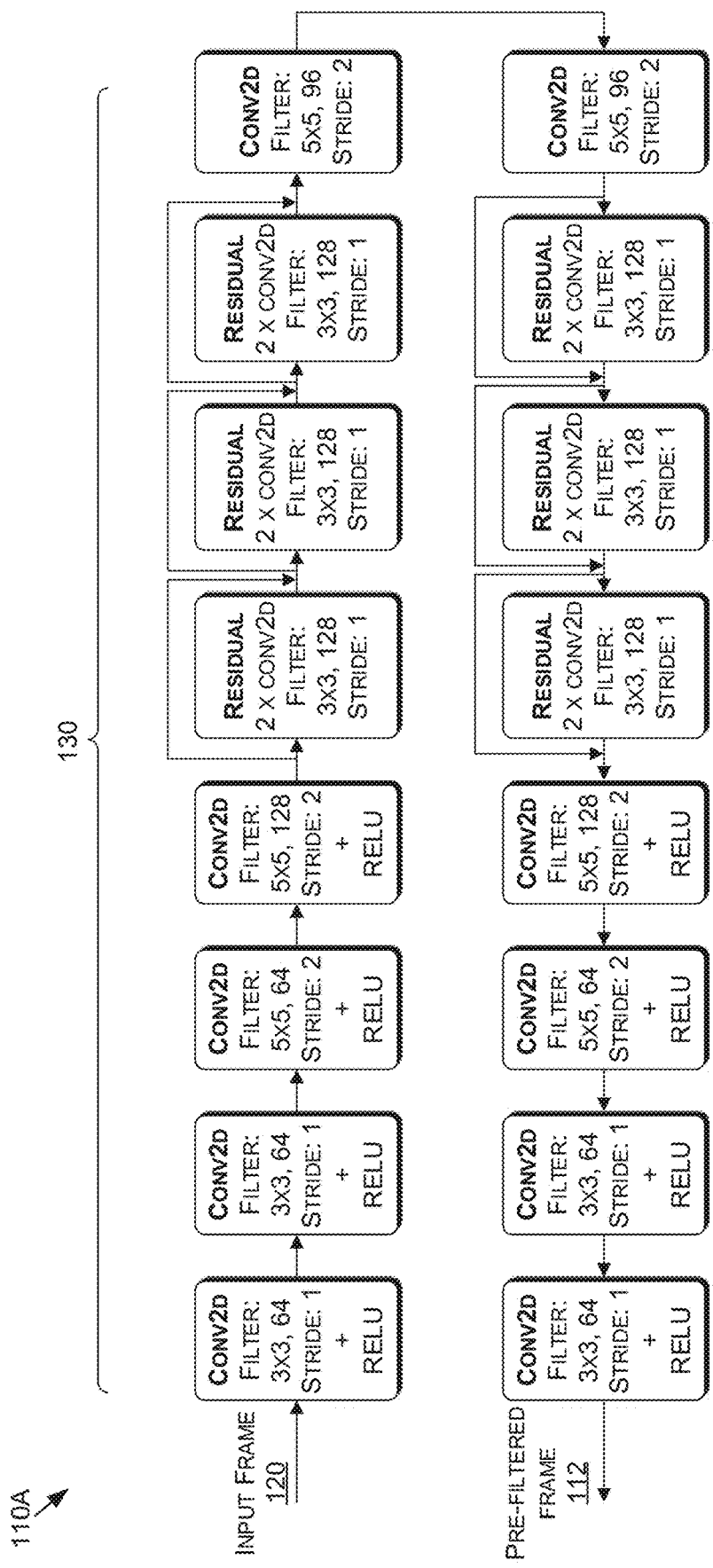
FIG. 1C is an example DNN architecture for use in pre-filtering a frame, in accordance with some embodiments of the present disclosure.
Figure 2C:
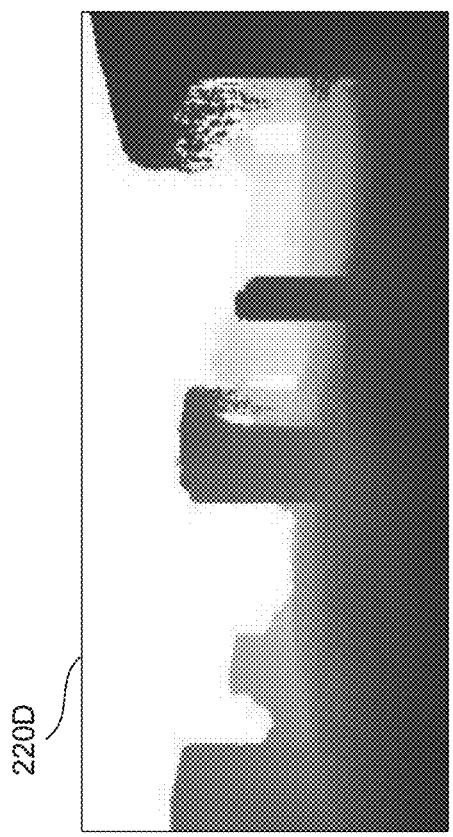
FIG. 2C is an example visualization of a frame, in accordance with some embodiments of the present disclosure.
Figure 2D:
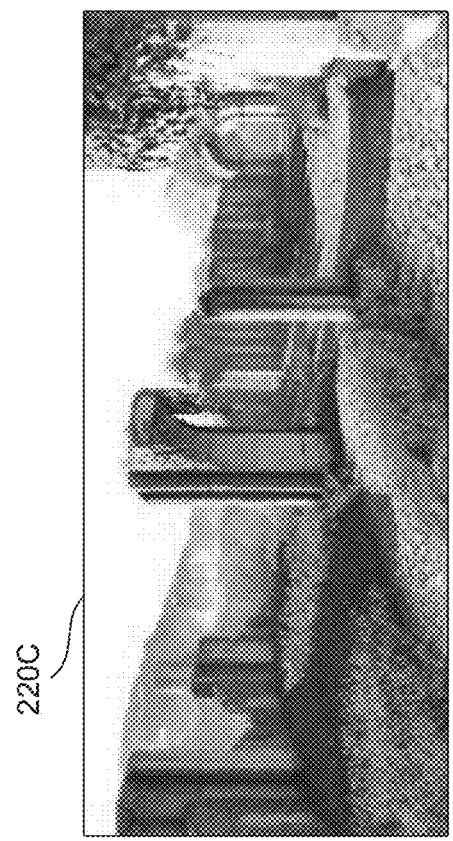
FIG. 2D is an example visualization of a depth map generated using the frame of FIG. 2C, in accordance with some embodiments of the present disclosure.
Figure 2E:
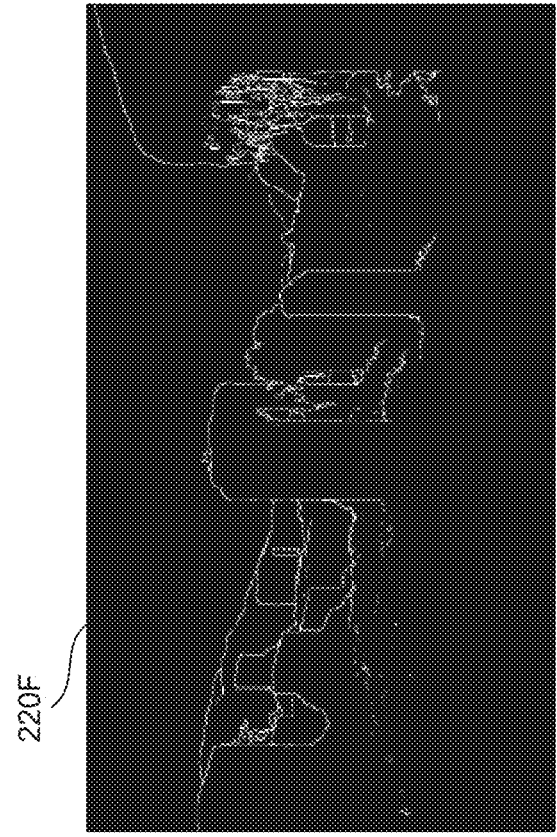
FIG. 2E is an example visualization of a surface normal map generated using the frame of FIG. 2C, in accordance with some embodiments of the present disclosure.
Figure 2F:
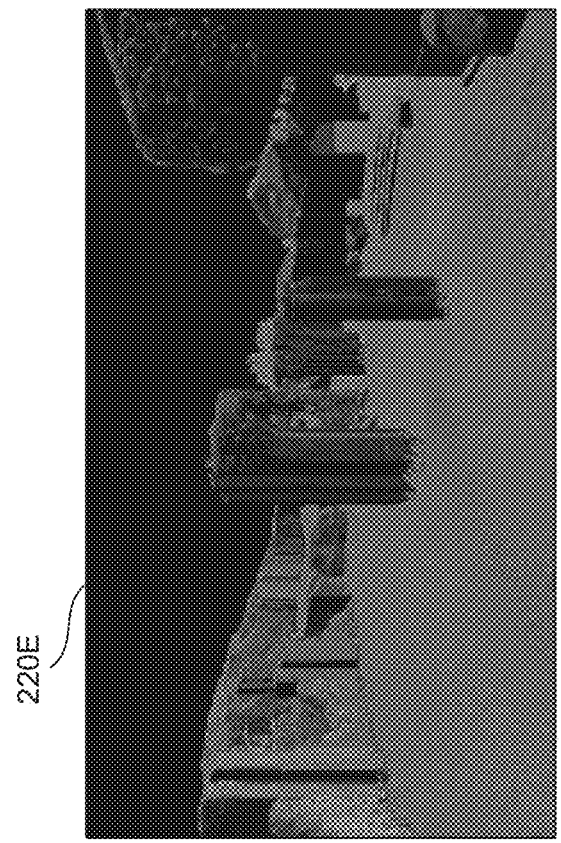
FIG. 2F is an example visualization of an edge map generated using the frame of FIG. 2C, in accordance with some embodiments of the present disclosure.

Turning briefly to FIG. 1C, FIG. 1C is an example DNN architecture 110A for use in pre-filtering an input frame 120, in accordance with some embodiments of the present disclosure. The DNN may include any number of layers 130. One or more of the layers 130 may include an input layer. The input layer may hold values associated with the input frame 120 (e.g., before or after post-processing). One or more layers 130 may include convolutional layers. The convolutional layers may compute the output of neurons that are connected to local regions in an input layer, each neuron computing a dot product between their weights and a small region they are connected to in an input volume. One or more of the layers 130 may include a rectified linear unit (ReLU) layer. The ReLU layer(s) may apply an elementwise activation function, such as the max (0, x), thresholding at zero, for example. The resulting volume of a ReLU layer may be the same as the volume of the input of the ReLU layer. One or more of the layers 130 may include a pooling layer. The pooling layer may perform a down sampling operation along the spatial dimensions (e.g., the height and the width), which may result in a smaller volume than the input of the pooling layer. One or more of the layers 130 may include one or more fully connected layer(s). Each neuron in the fully connected layer(s) may be connected to each of the neurons in the previous volume. The fully connected layer may compute class scores, and the resulting volume may be 1×1×number of classes. In some examples, the CNN may include a fully connected layer(s) such that the output of one or more of the layers 130 of the CNN may be provided as input to a fully connected layer(s) of the CNN. In some examples, one or more convolutional streams may be implemented by the DNN, and some or all of the convolutional streams may include a respective fully connected layer(s). In some non-limiting embodiments, the DNN may include a series of convolutional and max pooling layers to facilitate image feature extraction, followed by multi-scale dilated convolutional and up-sampling layers to facilitate global context feature extraction.

Although input layers, convolutional layers, pooling layers, ReLU layers, and fully connected layers are discussed herein with respect to the DNN 110, this is not intended to be limiting. For example, additional or alternative layers may be used in the DNN 110, such as normalization layers, SoftMax layers, and/or other layer types. In embodiments where the DNN 110 includes a CNN, different orders and numbers of the layers of the CNN may be used depending on the embodiment. In other words, the order and number of layers 130 of the DNN 110 is not limited to any one architecture.

In addition, some of the layers 130 may include parameters (e.g., weights and/or biases), such as the convolutional layers and the fully connected layers, while others may not, such as the ReLU layers and pooling layers. In some examples, the parameters may be learned by the DNN 110 during training. Further, some of the layers 130 may include additional hyper-parameters (e.g., learning rate, stride, epochs, etc.), such as the convolutional layers, the fully connected layers, and the pooling layers, while other layers may not, such as the ReLU layers. The parameters and hyper-parameters are not to be limited and may differ depending on the embodiment.

In some embodiments, to train the DNN 110, the training engine 114 may employ one or more loss functions, such as those used in unsupervised training block 124 of FIG. 1B. The training engine 114 may also receive and/or access various training data sets from a training data store 126 for use in training the DNN 110. With respect to loss functions, for example, an edge loss function of the training engine 114 may be used to train the DNN 110 to maintain edge detail between a frame output by the application engine 102 and the pre-filtered frame 112 such that pixel values along and/or near identified edges in the edge map 106 of the frame are maintained—or at least closely maintained—such that navigation through a scene depicted by an application corresponding to the application engine 102 is more clear. For example, looking at the input frame 120 in comparison to pre-filtered frame 112, the input frame 120 includes a substantial level of detail that is not visible in the pre-filtered frame 112. In particular, ground 130A of the input frame 120 includes details not visible in ground 130B of the pre-filtered frame 112. In embodiments, the edge loss function may compare pixel values of the frame data 108 and the pre-filtered frame 112 at pixel locations determined to correspond to edges from the edge map 106. That is, for a given pixel from the edge map 106 indicated as corresponding to an edge, the pixel value at that location in the frame data 108 and the pixel value at that location from the pre-filtered frame 112 may be compared in such a way that differences are penalized.

In some examples, the edge loss function may be computed according to equation (2) below:

$$\mathcal{L}_{Edge} = \Sigma\Sigma \|\text{EMASK}(i,j) * (\text{F}(i,j) - \text{PF}(i,j))\|^p \tag{2}$$

where a pixel location (i, j) in the edge mask (e.g., 122) is used to compare the corresponding pixel location (i, j) in the original frame (F) (e.g., frame 120) to the corresponding pixel location (i, j) in the pre-filtered frame (PF) (128). This process may be repeated for each pixel determined to correspond to an edge pixel from the edge map.

As another example, an entropy loss function of the training engine 114 may be used that corresponds to reducing or meeting a frame entropy corresponding to a currently desired entropy control parameter value (e.g., higher value of an entropy control parameter, lower entropy of the pre-filtered frame, and vice versa). For example, the entropy loss function may measure pixel gradients within portions of the pre-filtered frame 112—except for portions corresponding to edges as identified using the edge maps 106—in order to reduce the gradient between neighboring pixels. In such an example, the higher the entropy control parameter value, the more a higher gradient is penalized using the entropy loss function. As such, where a high value for the entropy control parameter is used (e.g., indicative of lower frame entropy), the gradient between neighboring or surrounding pixels may be reduced such that differences in pixel values between neighboring or surrounding pixels are minimal. Similarly, for lower entropy control parameter values (e.g., indicative of higher frame entropy), the gradient between neighboring or surrounding pixels may be reduced less such that differences in pixels are allowed to be greater (but not as great as a full entropy frame).

In some embodiments, the entropy loss function may be computed according to equation (3) below:

$$\text{Entropy} = \Sigma\Sigma\|(PF(i,j) - PF(i+m, j+n))\| \qquad (3)$$

where (i, j) corresponds to an (x, y) pixel location that is not an edge pixel, and m is a pixel distance in an x direction, and n is a pixel distance in a y direction. For example, n may include values of +1 and −1, and m may include values of +1 and −1, and one or more of the combinations of these values are used to identify pixels to compare to the pixel (i, j).

Where more than one loss function is used, the loss functions may be weighted during training. For example, the entropy control parameter value may be used to weight the loss functions such that for higher entropy control parameter values, consistency between pixel values of neighboring or surrounding pixels is more heavily enforced, and vice versa. For example, the total loss function may be computed according to equation (4), below:

$$\text{Total Loss} = \mathcal{L}_{Edge} + \lambda^* \mathcal{L}_{Entropy} \qquad (4)$$

where λ corresponds to the entropy control parameter. As such, in examples with lower entropy, the higher the λ value, and thus the greater the entropy loss function is weighted as compared to the edge loss function. In contrast, in examples with higher entropy, the lower the λ value, and thus the less the entropy loss function is weighted as compared to the edge loss function.

Figure 3:
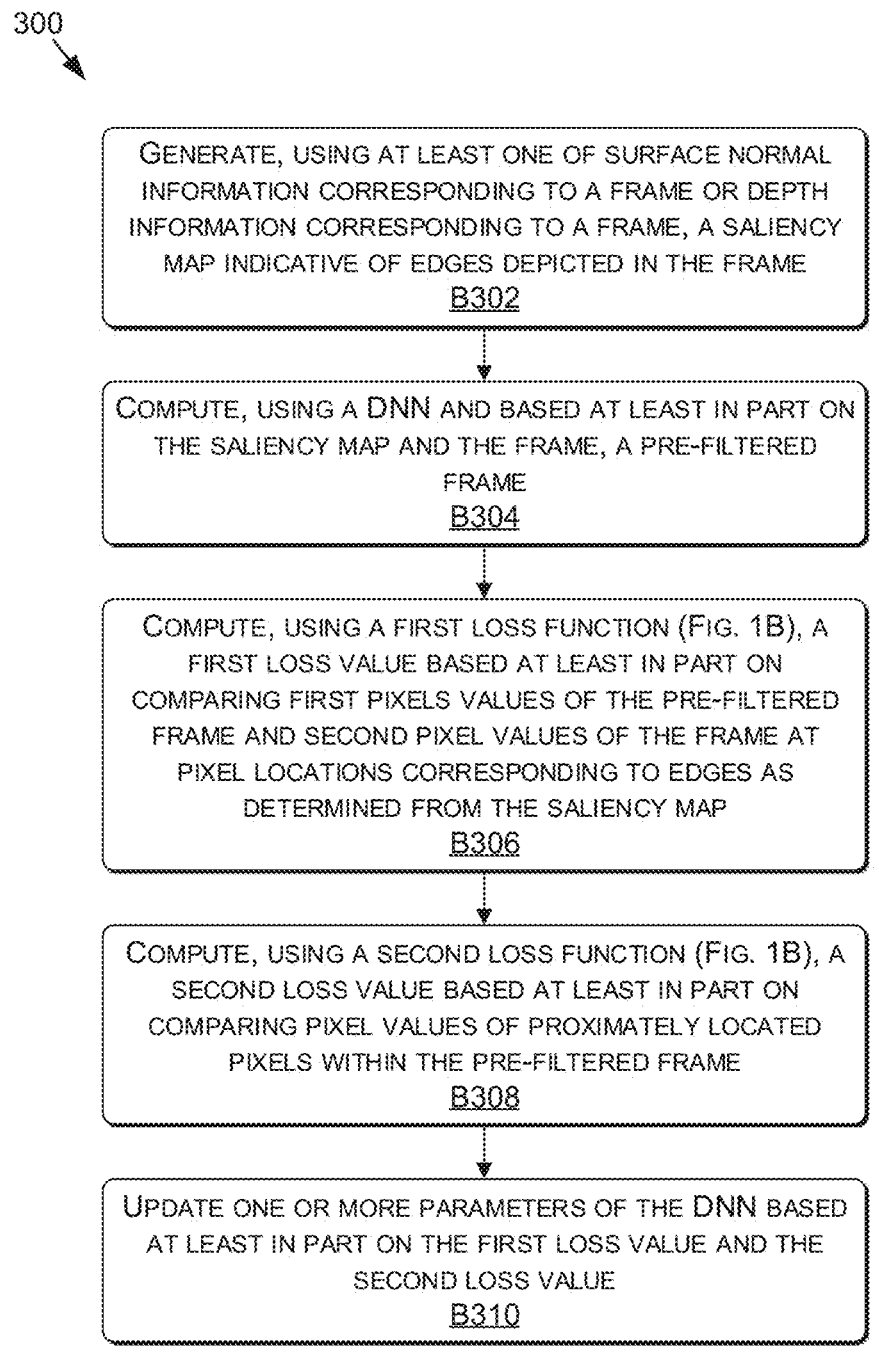
FIG. 3 is a flow diagram showing a method for training a DNN to pre-filter a frame, in accordance with some embodiments of the present disclosure.

Now referring to FIG. 3, each block of method 300, described herein, comprises a computing process that may be performed using any combination of hardware, firmware, and/or software. For instance, various functions may be carried out by a processor executing instructions stored in memory. The method 300 may also be embodied as computer-usable instructions stored on computer storage media. The method 300 may be provided by a standalone application, a service or hosted service (standalone or in combination with another hosted service), or a plug-in to another product, to name a few. In addition, method 300 is described, by way of example, with respect to the system of FIG. 1. However, this method may additionally or alternatively be executed by any one system, or any combination of systems, including, but not limited to, those described herein.

FIG. 3 is a flow diagram showing a method 300 for training a DNN to pre-filter a frame, in accordance with some embodiments of the present disclosure. The method 300, at block B302, includes generating, using at least one of surface normals or depth values corresponding to a frame, a saliency map indicative of edges depicted in the frame. For example, depth information and/or surface normal information may be maintained by a currently executing application, and this information may be used to generate edge maps or saliency maps. In some embodiments, in addition to or alternatively from using the surface normal and/or the depth values, the pixel values from the frame data may be used.

The method 300, at block B304, includes computing, using a DNN and based at least in part on data representative of the saliency map and the frame, a pre-filtered frame. For example, the DNN(s) 110 may be used to generate the pre-filtered frame using the frame data and the edge maps.

The method 300, at block B306, includes computing, using a first loss function, a first loss value based at least in part on comparing first pixel values of the pre-filtered frame and second pixel values of the frame at pixel locations corresponding to edges as determined from the saliency map. For example, the edge loss function may compare pixel values of the frame and the pre-filtered frame at pixel locations determined to correspond to edges from the edge map. That is, for a given pixel from the edge map indicated as corresponding to an edge, the pixel value at that location in the frame and the pixel value at that location from the pre-filtered frame may be compared in such a way that differences are penalized—e.g., the loss is higher where the pixel values differ more.

The method 300, at block B308, includes computing, using a second loss function, a second loss value based at least in part on comparing pixel values of proximately located pixels within the pre-filtered frame. For example, the entropy loss function may measure pixel gradients within portions of the pre-filtered frame—except for portions corresponding to edges as identified using the edge maps—in order to reduce the gradient between neighboring pixels. For example, for a DNN 110 corresponding to a higher entropy control parameter (and thus a lower frame entropy), differences between the neighboring pixels may be penalized more. As another example, for a DNN 110 corresponding to a lower entropy control parameter (and thus a higher frame entropy), differences between the neighboring pixels may be penalized less—but still penalized in order to reduce the frame entropy from that of the original frame.

The method 300, at block B310, includes updating one or more parameters of the DNN based at least in part on the first loss value and the second loss value. For example, parameters (e.g., weights and/or biases) of the DNN(s) 110 may be updated using the training engine 114 until an acceptable level of accuracy is achieved. In some embodiments, the first loss value and the second loss value may be used together—and weighted—to generate a final loss value, such as described herein.

Figure 4:
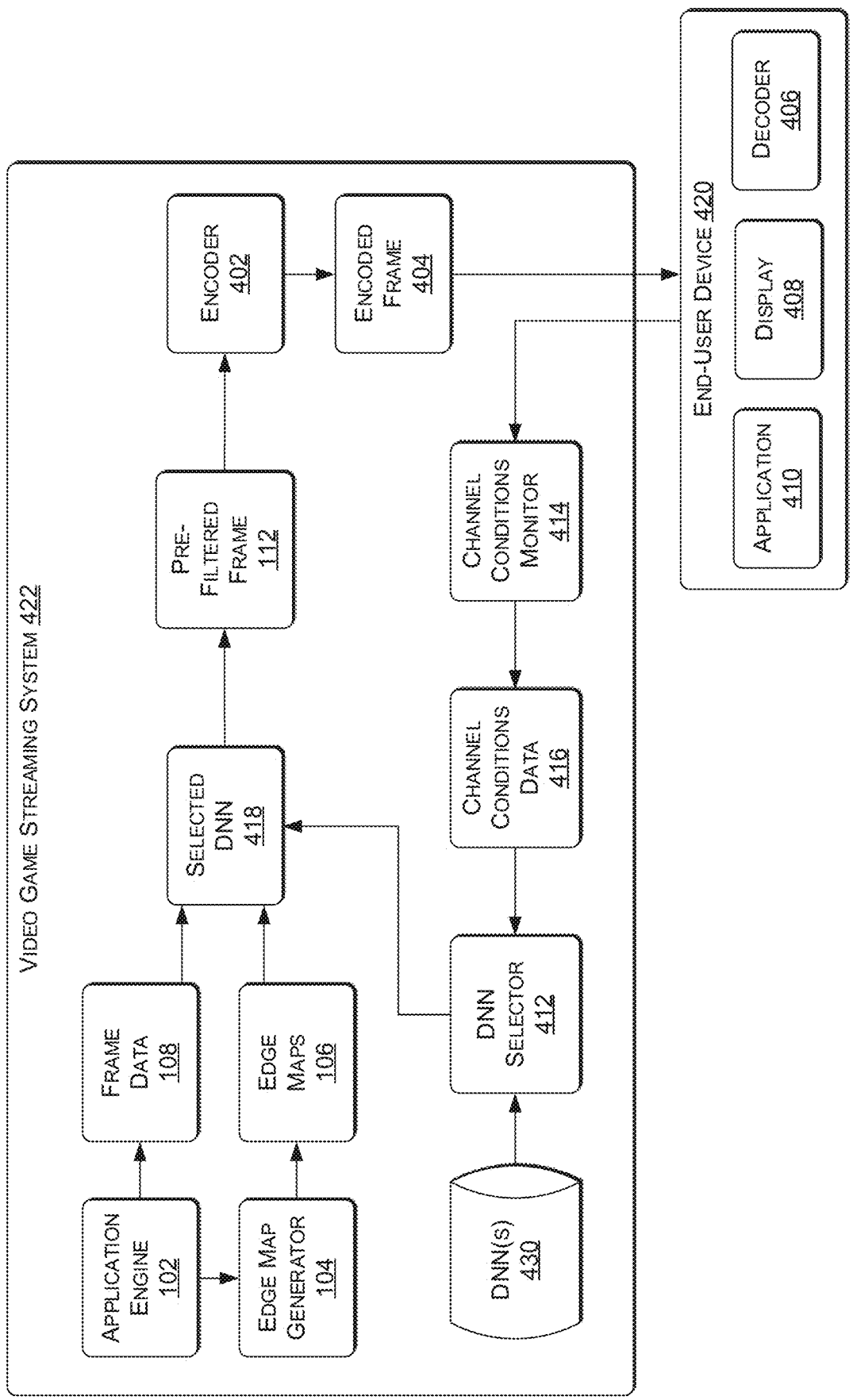
FIG. 4 is a data flow diagram showing an example process for using a DNN to pre-filter a frame, in accordance with some embodiments of the present disclosure.
Figure 5A:
FIGS. 5A-5D are example visualizations of pre-filtered frames at different entropy levels, in accordance with some embodiments of the present disclosure.
Figure 5B:
Figure 5C:
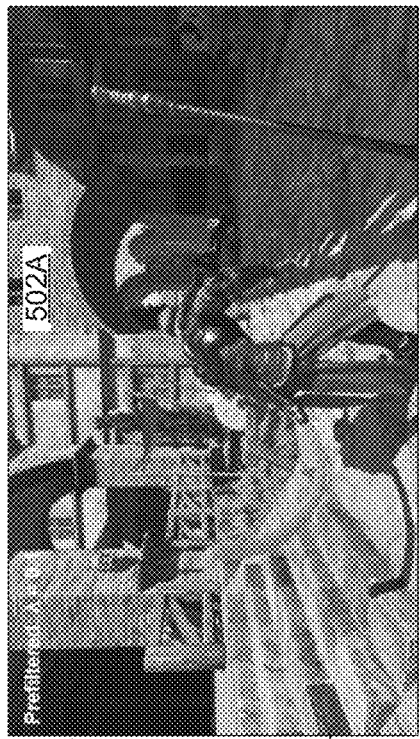
Figure 5D:

Turning to FIG. 4, FIG. 4 is a data flow diagram showing an example process 400 for using a DNN to pre-filter a frame, in accordance with some embodiments of the present disclosure. FIG. 4 includes a video game streaming system 422, application engine 102, edge map generator 104, edge maps 106, frame data 108, selected DNN 418, pre-filtered frame 112, encoder 402, encoded frame 404, end-user device 420, channel conditions monitor 414, channel conditions data, DNN selector 412, and DNN(s) 430.

The end-user device 420 may include a smart phone, a laptop computer, a tablet computer, a desktop computer, a wearable device, a game console, a virtual reality (VR) or augmented reality (AR) system (e.g., a headset, a computer, a game console, remote(s), controller(s), and/or other components), a content streaming device (e.g., NVIDIA SHIELD), a smart-home device that may include an intelligent personal assistant, and/or another type of device capable of supporting application streaming.

The end-user device 420 may include a decoder 406, display 408, and application 410. Although only a few components and/or features of the end-user device 420 are illustrated in FIG. 4, this is not intended to be limiting. For example, the end-user device 420 may include additional or alternative components, such as those described below with respect to the computing device 800 of FIG. 8. The application 410 may be any application where frame pre-filtering may be implemented to reduce a bit rate or complexity of a frame—such as in simulation applications, virtual reality (VR), augmented reality (AR), and/or mixed reality (MR) applications, content editing applications, social media applications, remote desktop applications, content streaming applications, game streaming applications, video conferencing applications, and/or the like.

The display 408 may include any type of display capable of displaying the application 410 (e.g., a light-emitting diode display (LED), an organic LED display (OLED), a liquid crystal display (LCD), an active matrix OLED display (AMOLED), a quantum dot display (QDD), a plasma display, an LED/LCD display, and/or another type of display). In some examples, the display 408 may include more than one display (e.g., a dual-monitor display for computer gaming, a first display for configuring a game and a virtual reality display for playing a game, etc.). In some examples, the display 408 is a touch-screen display, such as a touch-screen of a smart phone, tablet computer, laptop computer, or the like.

In operation, the end-user device 420 may transmit channel conditions (e.g., bandwidth, channel capacity, bit rate, signal to noise ratio (SINR), spectral efficiency, and/or additional state information) to the channel conditions monitor of the video game streaming system 422. The channel conditions monitor 414 may process and/or format the transmitted channel conditions to generate channel condition data 416 that may be provided to the DNN selector 412. The DNN selector 412 may compare the channel condition data 416 to a lookup table or the channel condition data 416 inserted into an algorithm, and an entropy control parameter may be computed by the DNN selector 412. Once computed, the DNN selector 412 may access the DNN(s) 430 and use the entropy control parameter to select a DNN that corresponds to the control parameter, which is associated with the channel condition data 416. It should be noted that the DNN(s) 430 and the selected DNN 418 may correspond to trained or deployed instances of the DNN(s) 110 of FIGS. 1A-1C.

The DNN(s) 430 may store several DNNs, each corresponding to different levels of filtering—e.g., to a different entropy control parameter. Depending on the level of filtering, a pre-filtered frame may include more or less visual detail when displayed on the display 408 of the end-user device 420. Turning briefly to FIGS. 5A-5D, for example, each of frames 500A/B/C/D correspond to a different entropy control parameters (e.g., 0.1, 0.5, 1.0, and 3.0, respectively), which correspond to high entropy, medium entropy, low entropy, and very low entropy, respectively. Each of the frames 500A/B/C/D include an archway 502A/B/C/D. As can be seen, archway 502A includes a significant level of detail with well-defined and visible bricks in the archway 502A. Archway 502B includes less detail when compared to 502A. Archway 502B includes some degree of texture to illustrate bricks, but they are not well defined visually. Archway 502C includes less detail when compared to 502B. The archway 502C includes some degree of detail for the archway 502C, but no bricks are visible. Lastly, archway 502D includes still less detail when compared to archway 502C. The archway 502D includes no texture and no bricks are visible. However, the edges of the archway 502D are maintained, which allows a user to navigate a game corresponding to the frames 500A/B/C/D.

Returning to FIG. 4, the DNN selector 412 may use the entropy control parameter to select a DNN—e.g., the selected DNN 418—that corresponds to the control parameter. The video game streaming system 422 may then provide to the selected DNN 418—as described in relation to FIGS. 1A-1C—the frame data 108 and the edge maps 106 to generate the pre-filtered frame 112. The pre-filtered frame 112 may then be encoded and compressed by the encoder 402 to generate the encoded frame 404. The encoded frame 404 may include a reduced bit rate when compared to the input frame—where the selected DNN 418 is trained to reduce the entropy—and the encoded frame 404 may then be transmitted to the application 410 of the end-user device 420. The application 410 may use the decoder 406 to decode the encoded frame 404 and to generate the pre-filtered frame 112 for display via the display 408.

In some embodiments, in addition to or alternatively from having different DNNs 430 for different entropy control parameters—e.g., to generate pre-filtered frames 112 of varying entropy levels—a single DNN 430 may be trained to use the entropy control parameter as input, and using the entropy control parameter, in addition to the frame data 108 and the edge maps 106, the DNN 430 may compute the pre-filtered frame 112 according to the desired entropy value.

Figure 6:
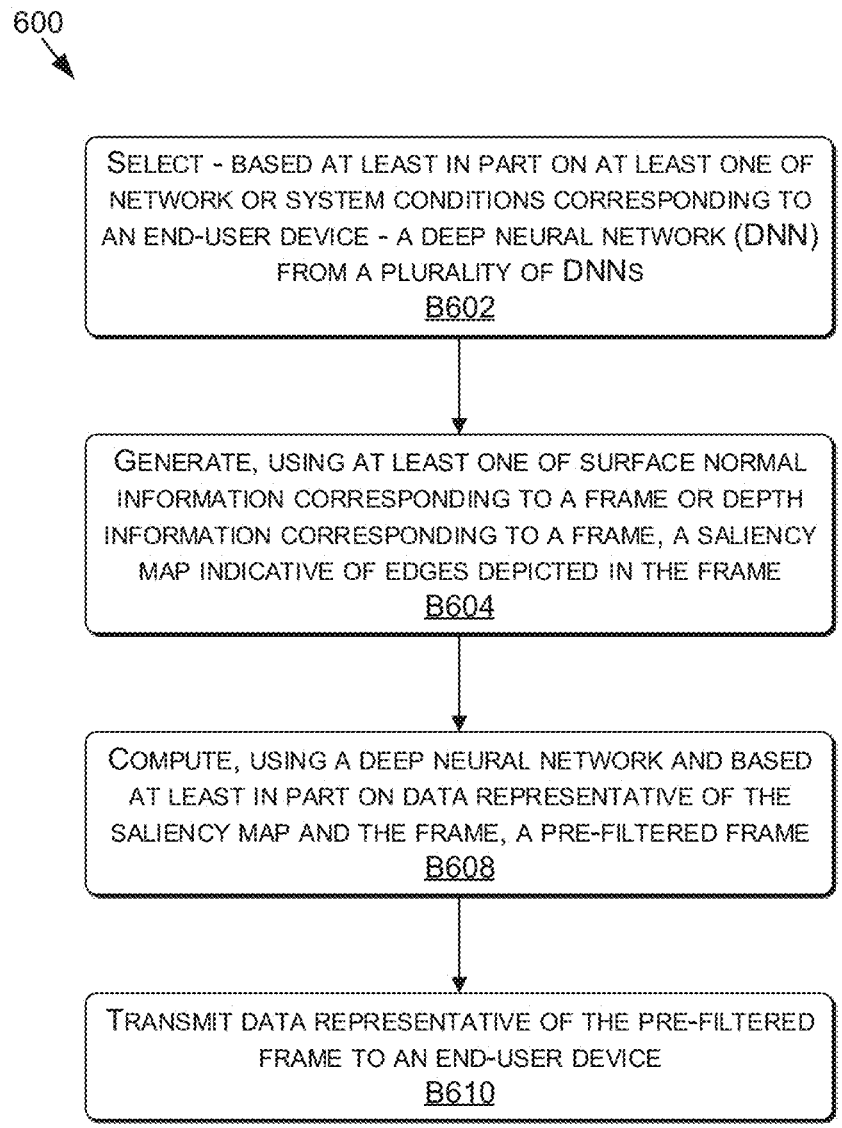
FIG. 6 is a flow diagram showing a method for pre-filtering a frame using a DNN, in accordance with some embodiments of the present disclosure.

Now referring to FIG. 6, each block of method 600, described herein, comprises a computing process that may be performed using any combination of hardware, firmware, and/or software. For instance, various functions may be carried out by a processor executing instructions stored in memory. The method 600 may also be embodied as computer-usable instructions stored on computer storage media. The method 600 may be provided by a standalone application, a service or hosted service (standalone or in combination with another hosted service), or a plug-in to another product, to name a few. In addition, method 600 is described, by way of example, with respect to the system of FIG. 4. However, this method may additionally or alternatively be executed by any one system, or any combination of systems, including, but not limited to, those described herein.

FIG. 6 is a flow diagram showing a method 600 for pre-filtering a frame using a DNN, in accordance with some embodiments of the present disclosure. The method 600, at block B602, includes selecting, based at least in part on at least one of network or system conditions corresponding to an end-user device, a deep neural network (DNN) from a plurality of DNNs. For example, where system and/or network performance is low, a lower entropy may be desired, and thus the entropy control parameter may be higher such that a DNN-based pre-filter is selected that filters—or blurs—a frame more drastically in an effort to reduce the bit rate of the stream.

The method 600, at block B604, includes generating, using at least one of surface normals or depth values corresponding to a frame, a saliency map indicative of edges depicted in the frame. For example, depth information and/or surface normal information may be maintained by a currently executing application, and this information may be used to generate edge maps or saliency maps using the edge map generator 104. In embodiments, in addition to or alternatively from using the depth information and/or the surface normal information, the frame data may be used to compare neighboring pixel values and to determine edges from sharp contrasts in neighboring pixel values.

The method 600, at block B606, includes computing, using the selected DNN and based at least in part on data representative of the saliency map and the frame, a pre-filtered frame. For example, once trained by the training engine, the selected DNN 418 may be used to generate the pre-filtered frame 112 using the frame data 108 and the edge maps 106.

The method 600, at block B608, includes transmitting data representative of the pre-filtered frame to an end-user device. For example, a computed pre-filtered frame 112 may then be encoded and compressed at a lower bit rate than the input frame—where less than full entropy is desired—and the encoded frame 404 may be transmitted to an end-user device 420. As a result, instead of having to switch image resolution due to suffering channel conditions, the entropy of the frame may be adjusted such that the pre-filtered frame may be transmitted at the same frame resolution. In this way, because the differential between pixel values frame to frame may be less as the entropy is less, the amount of data required to transmit the pre-filtered frame at the frame resolution as compared to the original frame data 108 is reduced, thus resulting in reduced latency.

EXAMPLE CONTENT STREAMING SYSTEM

Figure 7:
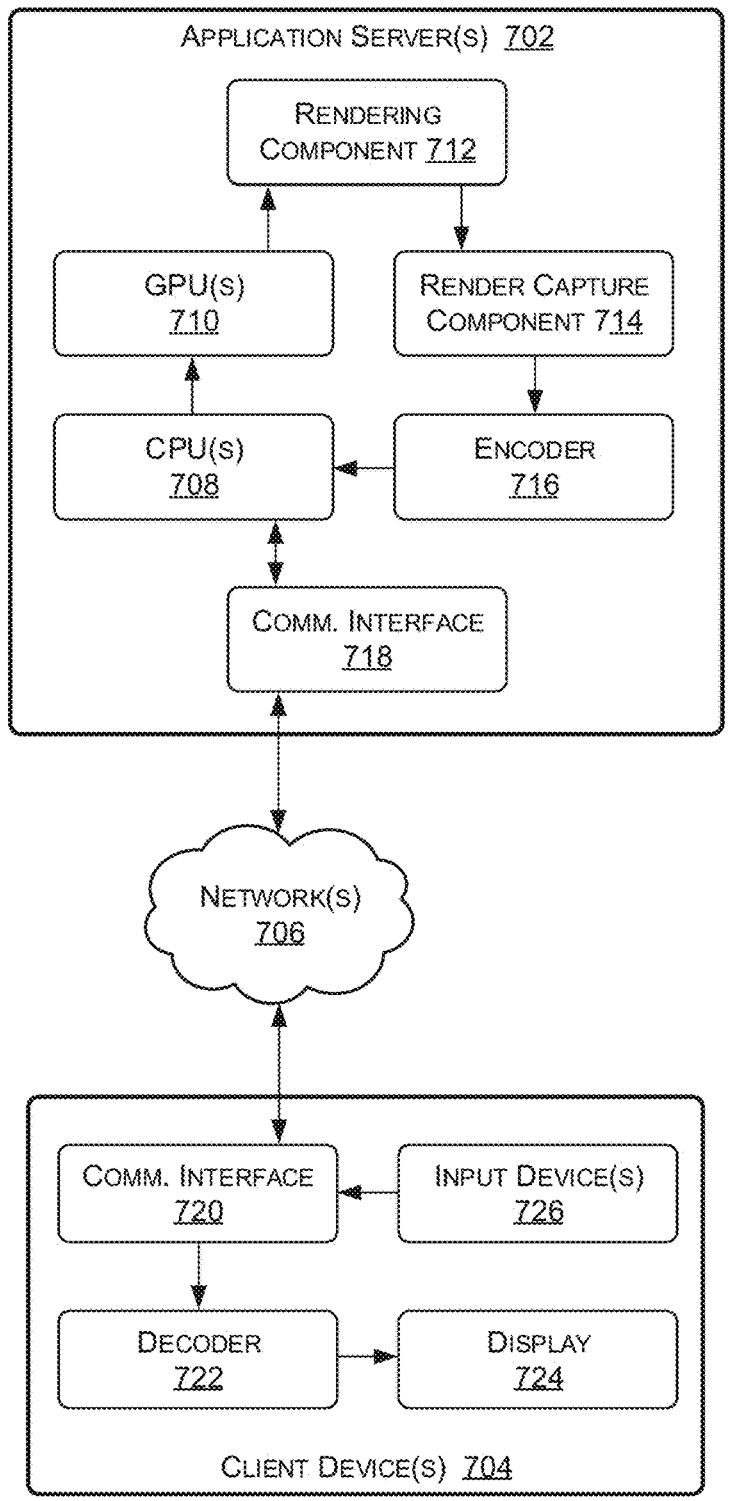
FIG. 7 is a block diagram of an example content streaming system suitable for use in implementing some embodiments of the present disclosure.

Now referring to FIG. 7, FIG. 7 is an example system diagram for a content streaming system 700, in accordance with some embodiments of the present disclosure. FIG. 7 includes application server(s) 702 (which may include similar components, features, and/or functionality to the example computing device 800 of FIG. 8), client device(s) 704 (which may include similar components, features, and/or functionality to the example computing device 800 of FIG. 8), and network(s) 706 (which may be similar to the network(s) described herein). In some embodiments of the present disclosure, the system 700 may be implemented. The application session may correspond to a game streaming application (e.g., NVIDIA GeFORCE NOW), a remote desktop application, a simulation application (e.g., autonomous or semi-autonomous vehicle simulation), computer aided design (CAD) applications, virtual reality (VR) and/or augmented reality (AR) streaming applications, deep learning applications, and/or other application types.

In the system 700, for an application session, the client device(s) 704 may only receive input data in response to inputs to the input device(s), transmit the input data to the application server(s) 702, receive encoded display data from the application server(s) 702, and display the display data on the display 724. As such, the more computationally intense computing and processing is offloaded to the application server(s) 702 (e.g., rendering—in particular ray or path tracing—for graphical output of the application session is executed by the GPU(s) of the game server(s) 702). In other words, the application session is streamed to the client device(s) 704 from the application server(s) 702, thereby reducing the requirements of the client device(s) 704 for graphics processing and rendering.

For example, with respect to an instantiation of an application session, a client device 704 may be displaying a frame of the application session on the display 724 based on receiving the display data from the application server(s) 702. The client device 704 may receive an input to one of the input device(s) and generate input data in response. The client device 704 may transmit the input data to the application server(s) 702 via the communication interface 720 and over the network(s) 706 (e.g., the Internet), and the application server(s) 702 may receive the input data via the communication interface 718. The CPU(s) may receive the input data, process the input data, and transmit data to the GPU(s) that causes the GPU(s) to generate a rendering of the application session. For example, the input data may be representative of a movement of a character of the user in a game session of a game application, firing a weapon, reloading, passing a ball, turning a vehicle, etc. The rendering component 712 may render the application session (e.g., representative of the result of the input data) and the render capture component 714 may capture the rendering of the application session as display data (e.g., as image data capturing the rendered frame of the application session). The rendering of the application session may include ray or path-traced lighting and/or shadow effects, computed using one or more parallel processing units—such as GPUs, which may further employ the use of one or more dedicated hardware accelerators or processing cores to perform ray or path-tracing techniques—of the application server(s) 702. In some embodiments, one or more virtual machines (VMs)—e.g., including one or more virtual components, such as vGPUs, vCPUs, etc.—may be used by the application server(s) 702 to support the application sessions. The encoder 716 may then encode the display data to generate encoded display data and the encoded display data may be transmitted to the client device 704 over the network(s) 706 via the communication interface 718. The client device 704 may receive the encoded display data via the communication interface 720 and the decoder 722 may decode the encoded display data to generate the display data. The client device 704 may then display the display data via the display 724.

EXAMPLE COMPUTING DEVICE

Figure 8:
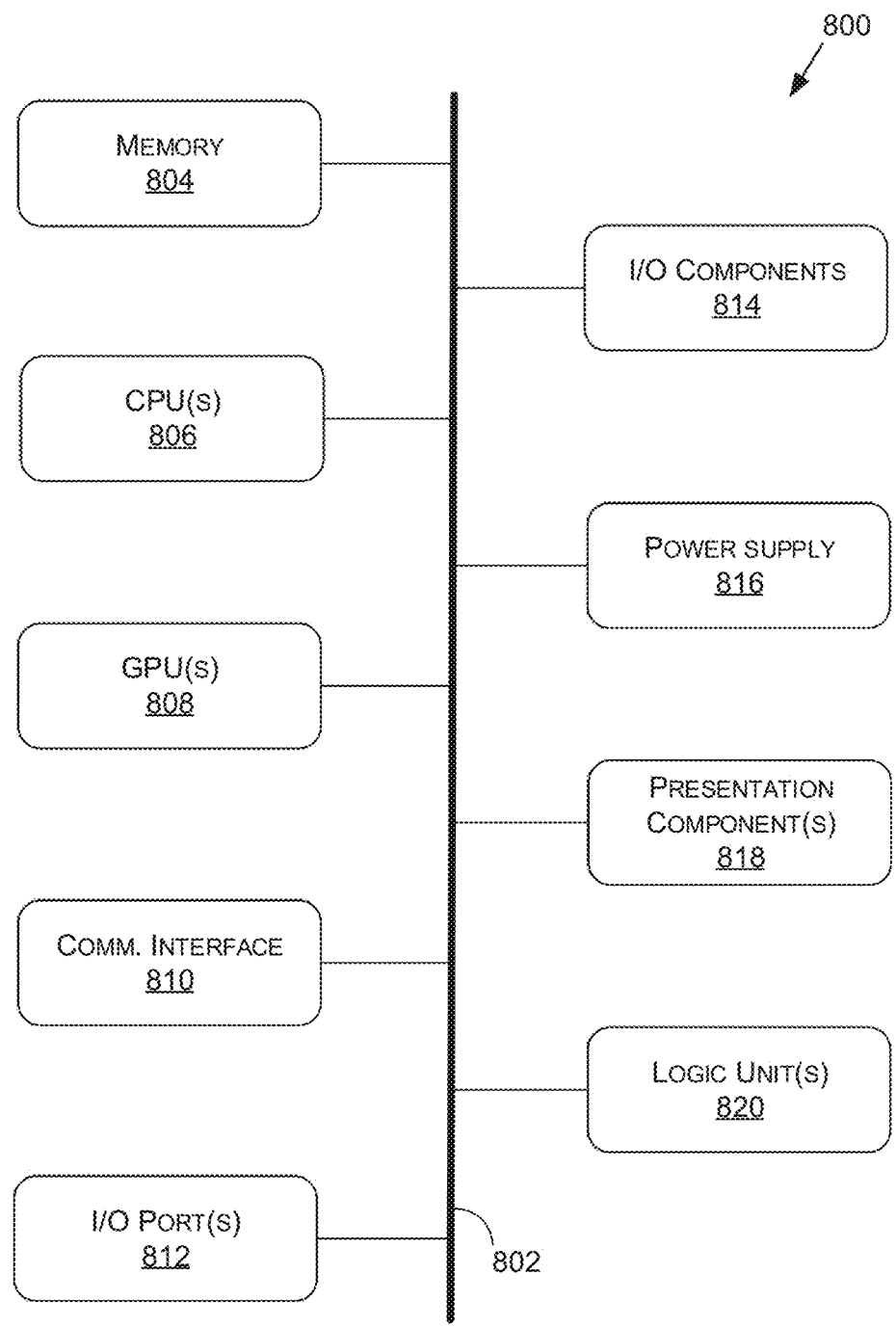
FIG. 8 is a block diagram of an example computing device suitable for use in implementing some embodiments of the present disclosure.

FIG. 8 is a block diagram of an example computing device(s) 800 suitable for use in implementing some embodiments of the present disclosure. Computing device 800 may include an interconnect system 802 that directly or indirectly couples the following devices: memory 804, one or more central processing units (CPUs) 806, one or more graphics processing units (GPUs) 808, a communication interface 810, input/output (I/O) ports 812, input/output components 814, a power supply 816, one or more presentation components 818 (e.g., display(s)), and one or more logic units 820. In at least one embodiment, the computing device(s) 800 may comprise one or more virtual machines (VMs), and/or any of the components thereof may comprise virtual components (e.g., virtual hardware components). For non-limiting examples, one or more of the GPUs 808 may comprise one or more vGPUs, one or more of the CPUs 806 may comprise one or more vCPUs, and/or one or more of the logic units 820 may comprise one or more virtual logic units. As such, a computing device(s) 800 may include discrete components (e.g., a full GPU dedicated to the computing device 800), virtual components (e.g., a portion of a GPU dedicated to the computing device 800), or a combination thereof.

Although the various blocks of FIG. 8 are shown as connected via the interconnect system 802 with lines, this is not intended to be limiting and is for clarity only. For example, in some embodiments, a presentation component 818, such as a display device, may be considered an I/O component 814 (e.g., if the display is a touch screen). As another example, the CPUs 806 and/or GPUs 808 may include memory (e.g., the memory 804 may be representative of a storage device in addition to the memory of the GPUs 808, the CPUs 806, and/or other components). In other words, the computing device of FIG. 8 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 8.

The interconnect system 802 may represent one or more links or busses, such as an address bus, a data bus, a control bus, or a combination thereof. The interconnect system 802 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 806 may be directly connected to the memory 804. Further, the CPU 806 may be directly connected to the GPU 808. Where there is direct, or point-to-point connection between components, the interconnect system 802 may include a PCIe link to carry out the connection. In these examples, a PCI bus need not be included in the computing device 800.

The memory 804 may include any of a variety of computer-readable media. The computer-readable media may be any available media that may be accessed by the computing device 800. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 804 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 800. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 806 may be configured to execute at least some of the computer-readable instructions to control one or more components of the computing device 800 to perform one or more of the methods and/or processes described herein. The CPU(s) 806 may each include one or more cores (e.g., one, two, four, eight, twenty-eight, seventy-two, etc.) that are capable of handling a multitude of software threads simultaneously. The CPU(s) 806 may include any type of processor, and may include different types of processors depending on the type of computing device 800 implemented (e.g., processors with fewer cores for mobile devices and processors with more cores for servers). For example, depending on the type of computing device 800, the processor may be an Advanced RISC Machines (ARM) processor implemented using Reduced Instruction Set Computing (RISC) or an x86 processor implemented using Complex Instruction Set Computing (CISC). The computing device 800 may include one or more CPUs 806 in addition to one or more microprocessors or supplementary co-processors, such as math co-processors.

In addition to or alternatively from the CPU(s) 806, the GPU(s) 808 may be configured to execute at least some of the computer-readable instructions to control one or more components of the computing device 800 to perform one or more of the methods and/or processes described herein. One or more of the GPU(s) 808 may be an integrated GPU (e.g., with one or more of the CPU(s) 806 and/or one or more of the GPU(s) 808 may be a discrete GPU. In embodiments, one or more of the GPU(s) 808 may be a coprocessor of one or more of the CPU(s) 806. The GPU(s) 808 may be used by the computing device 800 to render graphics (e.g., 3D graphics) or perform general purpose computations. For example, the GPU(s) 808 may be used for General-Purpose computing on GPUs (GPGPU). The GPU(s) 808 may include hundreds or thousands of cores that are capable of handling hundreds or thousands of software threads simultaneously. The GPU(s) 808 may generate pixel data for output images in response to rendering commands (e.g., rendering commands from the CPU(s) 806 received via a host interface). The GPU(s) 808 may include graphics memory, such as display memory, for storing pixel data or any other suitable data, such as GPGPU data. The display memory may be included as part of the memory 804. The GPU(s) 808 may include two or more GPUs operating in parallel (e.g., via a link). The link may directly connect the GPUs (e.g., using NVLINK) or may connect the GPUs through a switch (e.g., using NVSwitch). When combined together, each GPU 808 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 806 and/or the GPU(s) 808, the logic unit(s) 820 may be configured to execute at least some of the computer-readable instructions to control one or more components of the computing device 800 to perform one or more of the methods and/or processes described herein. In embodiments, the CPU(s) 806, the GPU(s) 808, and/or the logic unit(s) 820 may discretely or jointly perform any combination of the methods, processes and/or portions thereof. One or more of the logic units 820 may be part of and/or integrated in one or more of the CPU(s) 806 and/or the GPU(s) 808 and/or one or more of the logic units 820 may be discrete components or otherwise external to the CPU(s) 806 and/or the GPU(s) 808. In embodiments, one or more of the logic units 820 may be a coprocessor of one or more of the CPU(s) 806 and/or one or more of the GPU(s) 808.

Examples of the logic unit(s) 820 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 810 may include one or more receivers, transmitters, and/or transceivers that enable the computing device 800 to communicate with other computing devices via an electronic communication network, included wired and/or wireless communications. The communication interface 810 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 820 and/or communication interface 810 may include one or more data processing units (DPUs) to transmit data received over a network and/or through interconnect system 802 directly to (e.g., a memory of) one or more GPU(s) 808.

The I/O ports 812 may enable the computing device 800 to be logically coupled to other devices including the I/O components 814, the presentation component(s) 818, and/or other components, some of which may be built in to (e.g., integrated in) the computing device 800. Illustrative I/O components 814 include a microphone, mouse, keyboard, joystick, game pad, game controller, satellite dish, scanner, printer, wireless device, etc. The I/O components 814 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 800. The computing device 800 may be include depth cameras, such as stereoscopic camera systems, infrared camera systems, RGB camera systems, touchscreen technology, and combinations of these, for gesture detection and recognition. Additionally, the computing device 800 may include accelerometers or gyroscopes (e.g., as part of an inertia measurement unit (IMU)) that enable detection of motion. In some examples, the output of the accelerometers or gyroscopes may be used by the computing device 800 to render immersive augmented reality or virtual reality.

The power supply 816 may include a hard-wired power supply, a battery power supply, or a combination thereof. The power supply 816 may provide power to the computing device 800 to enable the components of the computing device 800 to operate.

The presentation component(s) 818 may include a display (e.g., a monitor, a touch screen, a television screen, a heads-up-display (HUD), other display types, or a combination thereof), speakers, and/or other presentation components. The presentation component(s) 818 may receive data from other components (e.g., the GPU(s) 808, the CPU(s) 806, DPUs, etc.), and output the data (e.g., as an image, video, sound, etc.).

EXAMPLE DATA CENTER

Figure 9:
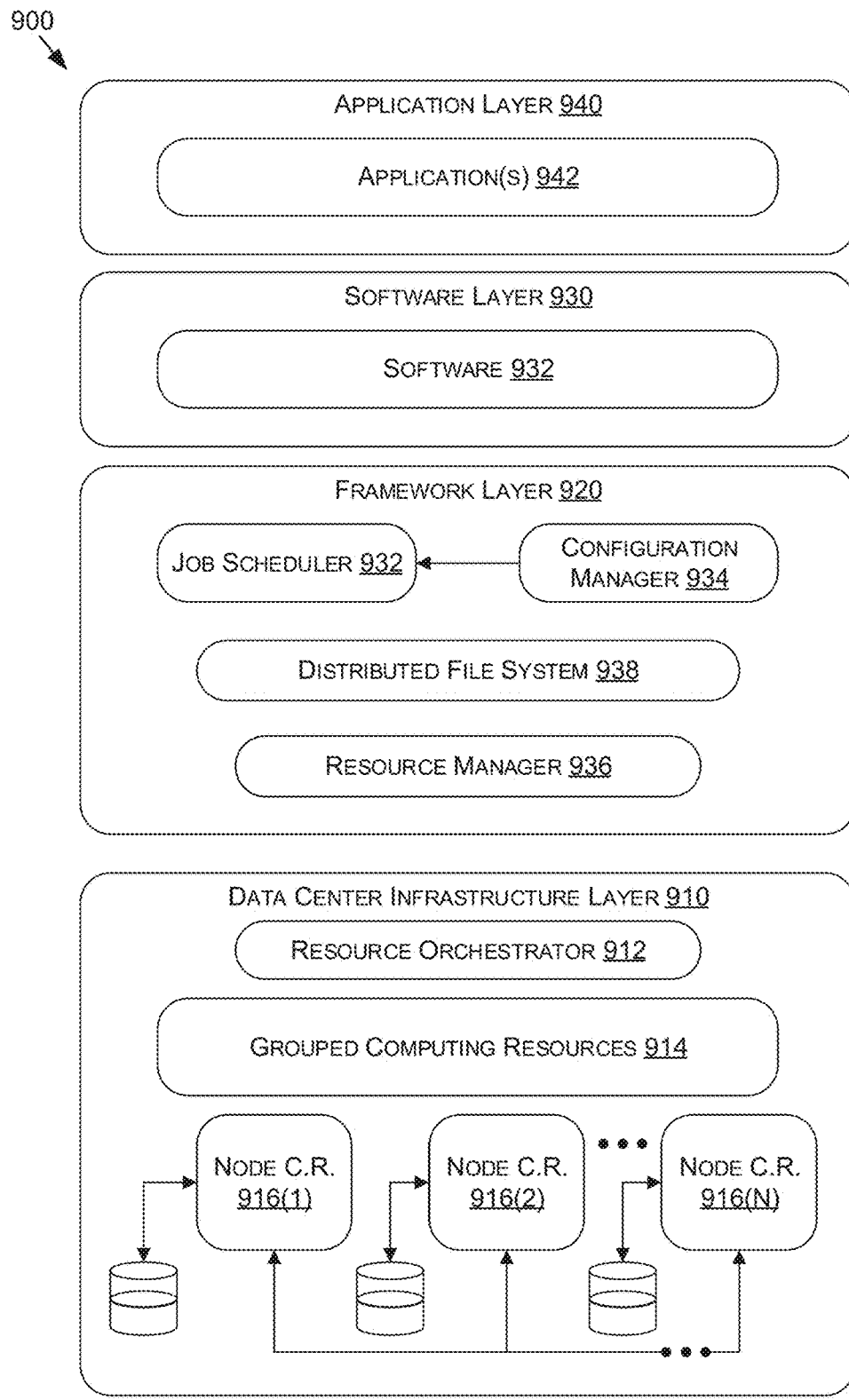
FIG. 9 is a block diagram of an example data center suitable for use in implementing some embodiments of the present disclosure.

FIG. 9 illustrates an example data center 900 that may be used in at least one embodiments of the present disclosure. The data center 900 may include a data center infrastructure layer 910, a framework layer 920, a software layer 930, and/or an application layer 940.

As shown in FIG. 9, the data center infrastructure layer 910 may include a resource orchestrator 912, grouped computing resources 914, and node computing resources ("node C.R.s") 916(1)-916(N), where "N" represents any whole, positive integer. In at least one embodiment, node C.R.s 916(1)-916(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 916(1)-916(N) may correspond to a server having one or more of the above-mentioned computing resources. In addition, in some embodiments, the node C.R.s 916(1)-9161(N) may include one or more virtual components, such as vGPUs, vCPUs, and/or the like, and/or one or more of the node C.R.s 916(1)-916(N) may correspond to a virtual machine (VM).

In at least one embodiment, grouped computing resources 914 may include separate groupings of node C.R.s 916 housed within one or more racks (not shown), or many racks housed in data centers at various geographical locations (also not shown). Separate groupings of node C.R.s 916 within grouped computing resources 914 may include grouped compute, network, memory or storage resources that may be configured or allocated to support one or more workloads. In at least one embodiment, several node C.R.s 916 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 912 may configure or otherwise control one or more node C.R.s 916(1)-916(N) and/or grouped computing resources 914. In at least one embodiment, resource orchestrator 912 may include a software design infrastructure (SDI) management entity for the data center 900. The resource orchestrator 912 may include hardware, software, or some combination thereof.

In at least one embodiment, as shown in FIG. 9, framework layer 920 may include a job scheduler 932, a configuration manager 934, a resource manager 936, and/or a distributed file system 938. The framework layer 920 may include a framework to support software 932 of software layer 930 and/or one or more application(s) 942 of application layer 940. The software 932 or application(s) 942 may respectively include web-based service software or applications, such as those provided by Amazon Web Services, Google Cloud and Microsoft Azure. The framework layer 920 may be, but is not limited to, a type of free and open-source software web application framework such as Apache Spark™ (hereinafter "Spark") that may utilize distributed file system 938 for large-scale data processing (e.g., "big data"). In at least one embodiment, job scheduler 932 may include a Spark driver to facilitate scheduling of workloads supported by various layers of data center 900. The configuration manager 934 may be capable of configuring different layers such as software layer 930 and framework layer 920 including Spark and distributed file system 938 for supporting large-scale data processing. The resource manager 936 may be capable of managing clustered or grouped computing resources mapped to or allocated for support of distributed file system 938 and job scheduler 932. In at least one embodiment, clustered or grouped computing resources may include grouped computing resource 914 at data center infrastructure layer 910. The resource manager 936 may coordinate with resource orchestrator 912 to manage these mapped or allocated computing resources.

In at least one embodiment, software 932 included in software layer 930 may include software used by at least portions of node C.R.s 916(1)-916(N), grouped computing resources 914, and/or distributed file system 938 of framework layer 920. One or more types of software may include, but are not limited to, Internet web page search software, e-mail virus scan software, database software, and streaming video content software.

In at least one embodiment, application(s) 942 included in application layer 940 may include one or more types of applications used by at least portions of node C.R.s 916(1)-916(N), grouped computing resources 914, and/or distributed file system 938 of framework layer 920. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 934, resource manager 936, and resource orchestrator 912 may implement any number and type of self-modifying actions based on any amount and type of data acquired in any technically feasible fashion. Self-modifying actions may relieve a data center operator of data center 900 from making possibly bad configuration decisions and possibly avoiding underutilized and/or poor performing portions of a data center.

The data center 900 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 900. In at least one embodiment, trained or deployed machine learning models corresponding to one or more neural networks may be used to infer or predict information using resources described above with respect to the data center 900 by using weight parameters calculated through one or more training techniques, such as but not limited to those described herein.

In at least one embodiment, the data center 900 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

EXAMPLE NETWORK ENVIRONMENTS

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 800 of FIG. 8—e.g., each device may include similar components, features, and/or functionality of the computing device(s) 800. In addition, where backend devices (e.g., servers, NAS, etc.) are implemented, the backend devices may be included as part of a data center 900, an example of which is described in more detail herein with respect to FIG. 9.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 800 described herein with respect to FIG. 8. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. At least one processor comprising:
   processing circuitry to:
   select a value of an entropy control parameter based at least on one or more network or system conditions associated with an end-user device, wherein respective values for the entropy control parameter correspond to respective entropy levels;
   generate, using at least one of surface normal information corresponding to a frame or depth information corresponding to a frame, a saliency map indicative of edges depicted in the frame;
   based at least on the selecting of the value of the entropy control parameter, filter, using a deep neural network (DNN) and the saliency map, the frame using an entropy level of the respective entropy levels that corresponds to the value to produce a pre-filtered frame; and
   transmit data representative of the pre-filtered frame to an end-user device.

2. The at least one processor of claim 1, wherein the saliency map includes pixel values representing one of a binary image or a grayscale image, first magnitudes of the pixel values of pixels corresponding to an edge are distinguishable from second magnitudes of the pixel values of pixels that do not correspond to an edge, and the DNN is to filter the frame based at least on first magnitudes and the second magnitudes.

3. The at least one processor of claim 1, further comprising processing circuitry to encode the pre-filtered frame to generate an encoded frame of a video stream, wherein the data representative of the pre-filtered frame is data representative of the encoded frame and the one or more network or system conditions corresponds to a bitrate of the video stream.

4. The at least one processor of claim 1, further comprising processing circuitry to:
   monitor the one or more network or system conditions associated with the end-user device; and
   based at least on the value, select the DNN from a plurality of DNNs each corresponding to a respective value for the entropy control parameter.

5. The at least one processor of claim 1, wherein the depth information corresponds to a depth map, the surface normal information corresponds to a surface normal map, and the generation of the saliency map includes:
   at least one of scaling or normalizing the at least one of the depth map or the surface normal map to generate one or more first intermediate maps;
   performing morphological closing on the one or more first intermediate maps to generate one or more second intermediate maps; and
   executing an edge detection algorithm on the one or more second intermediate maps to generate the saliency map.

6. The at least one processor of claim 1, wherein the DNN is to adjust the filtering to the respective entropy levels based at least on the respective values for the entropy control parameter.

7. The at least one processor of claim 1, wherein the DNN is trained using a first loss function corresponding to maintaining edge detail and a second loss function corresponding to the respective entropy levels.

8. The at least one processor of claim 1, wherein the DNN is to use the saliency map to filter pixels of the frame based at least on proximities of the pixels to the edges.

9. The at least one processor of claim 1, wherein the generating of the saliency map includes performing edge detection on the frame to identify the edges and based on the edge detection, encoding a representation of the edges in the saliency map, wherein the DDN filters the frame based at least on the representation of the edges.

10. The at least one processor of claim 1, wherein the processor is comprised in at least one of:
   a system for performing simulation operations;
   a system for performing deep learning operations;
   a system implemented using an edge device;
   a system incorporating one or more virtual machines (VMs);
   a system implemented at least partially in a data center; or
   a system implemented at least partially using cloud computing resources.

11. A system comprising:
   one or more processing units to execute operations comprising:
      determining a value for an entropy control parameter based at least on analyzing at least one of network or system conditions associated with an end-user device;
      selecting a deep neural network (DNN) from a plurality of DNNs based at least on the DNN including a respective value corresponding to the entropy control parameter;
      generating, using at least one of surface normals or depth values corresponding to a frame, a saliency map indicative of edges depicted in the frame;
      computing, using the selected DNN and based at least on data representative of the saliency map and the frame, a pre-filtered frame; and
      transmitting data representative of the pre-filtered frame to an end-user device.

12. The system of claim 11, wherein the plurality of DNNs are each corresponding to a respective value for the entropy control parameter.

13. The system of claim 11, wherein the saliency map includes a binary image including first pixels having a first value and second pixels having a second value, wherein the first pixels correspond to the edges.

14. The system of claim 11, wherein the operations further comprise encoding the pre-filtered frame to generate an encoded frame, wherein the data representative of the pre-filtered frame is data representative of the encoded frame.

15. The system of claim 11, wherein each DNN of the plurality of DNNs includes a respective value for the entropy control parameter.

16. The system of claim 11, wherein the depth values are encoded in a depth map, the surface normals are encoded in a surface normal map, and the generation of the saliency map includes:
   at least one of scaling or normalizing the at least one of the depth map or the surface normal map to generate one or more first intermediate maps;
   performing morphological closing on the one or more first intermediate maps to generate one or more second intermediate maps; and
   executing an edge detection algorithm on the one or more second intermediate maps to generate the saliency map.

17. The system of claim 16, wherein the edge detection algorithm includes a Sobel operator.

18. The system of claim 11, wherein the system is comprised in at least one of:
   a system for performing simulation operations;
   a system for performing deep learning operations;
   a system implemented using an edge device;
   a system incorporating one or more virtual machines (VMs);
   a system implemented at least partially in a data center; or
   a system implemented at least partially using cloud computing resources.

19. A method comprising:
   selecting a value of an entropy control parameter based at least on one or more network or system conditions associated with an end-user device, wherein respective values for the entropy control parameter correspond to respective entropy levels;
   generating, using at least one of surface normal information corresponding to a frame or depth information corresponding to a frame, a saliency map indicative of edges depicted in the frame;
   based at least on the selecting of the value of the entropy control parameter, filtering, using a deep neural network (DNN) and the saliency map, the frame using an entropy level of the respective entropy levels that corresponds to the value to produce a pre-filtered frame; and
   transmitting data representative of the pre-filtered frame to an end-user device.

20. The method of claim 19, wherein the saliency map includes one of a binary image or a grayscale image, and pixel values of the saliency map, wherein magnitudes of pixel values of pixels corresponding to an edge are distinguishable from magnitudes of pixel values of pixels that do not correspond to an edge.

21. The method of claim 19, further comprising encoding the pre-filtered frame to generate an encoded frame, wherein the data representative of the pre-filtered frame is data representative of the encoded frame.

22. The method of claim 19, further comprising:
   monitoring the one or more network or system conditions associated with the end-user device; and
   based at least on the value, selecting the DNN from a plurality of DNNs each corresponding to a respective value for the entropy control parameter.

23. The method of claim 19, wherein the depth information corresponds to a depth map, the surface normal information corresponds to a surface normal map, and the generation of the saliency map includes:
   at least one of scaling or normalizing the at least one of the depth map or the surface normal map to generate one or more first intermediate maps;
   performing morphological closing on the one or more first intermediate maps to generate one or more second intermediate maps; and
   executing an edge detection algorithm on the one or more second intermediate maps to generate the saliency map.

* * * * *